United States Patent
Blöcher et al.

(10) Patent No.: US 9,979,695 B2
(45) Date of Patent: May 22, 2018

(54) METHOD, DEVICE, AND SYSTEM FOR MONITORING A SECURITY NETWORK INTERFACE UNIT

(71) Applicant: SIEMENS AKTIENGESELLSCHAFT, München (DE)

(72) Inventors: Uwe Blöcher, Puchheim (DE); Rainer Falk, Poing (DE); David von Oheimb, Heimstetten (DE)

(73) Assignee: Siemens Aktiengesellschaft, München (DE)

( * ) Notice: Subject to any disclaimer, the term of this patent is extended or adjusted under 35 U.S.C. 154(b) by 9 days.

(21) Appl. No.: 14/913,414

(22) PCT Filed: Jul. 22, 2014

(86) PCT No.: PCT/EP2014/065714
§ 371 (c)(1),
(2) Date: Feb. 22, 2016

(87) PCT Pub. No.: WO2015/024722
PCT Pub. Date: Feb. 26, 2015

(65) Prior Publication Data
US 2016/0205069 A1 Jul. 14, 2016

(30) Foreign Application Priority Data
Aug. 23, 2013 (DE) .......... 10 2013 216 847

(51) Int. Cl.
*H04L 29/06* (2006.01)
*H04L 29/08* (2006.01)

(52) U.S. Cl.
CPC .......... *H04L 63/02* (2013.01); *H04L 63/0263* (2013.01); *H04L 63/1408* (2013.01);
(Continued)

(58) Field of Classification Search
CPC . H04L 63/20; H04L 63/1425; H04L 63/0227; H04L 63/1408; H04L 63/0236
See application file for complete search history.

(56) References Cited

U.S. PATENT DOCUMENTS 6,119,236 A * 9/2000 Shipley .................. H04L 63/02
713/153
7,472,418 B1 * 12/2008 McCorkendale ....... G06F 21/56
726/24
(Continued)

FOREIGN PATENT DOCUMENTS

DE 102011007387 * 10/2012 ............. H04L 12/66
DE 102011007387 A1 10/2012
(Continued)

OTHER PUBLICATIONS

PCT International Search Report and Written Opinion of the International Searching Authority dated Dec. 4, 2014 for corresponding PCT/EP2014/065714.

*Primary Examiner* — Farid Homayounmehr
*Assistant Examiner* — Christopher C Harris
(74) *Attorney, Agent, or Firm* — Lempia Summerfield Katz LLC

(57) ABSTRACT

The invention relates to a method for monitoring a security network interface unit (23), for example a firewall, which receives a stream of data packets via a first interface (21), checks said data stream with respect to filtering rules, and outputs said data stream to a second interface (22). The method has the steps of duplicating and outputting the data stream to the second interface (22), checking the output data stream for inadmissible data traffic, transmitting a warning message to the security network interface unit if inadmissible data traffic is detected in the data stream, and restricting the data stream by means of the security network interface unit if the warning message is received in the security (Continued)

network interface unit (23). The device or the system according to the invention comprises units which are designed to carry out the aforementioned method.

14 Claims, 4 Drawing Sheets

(52) U.S. Cl.
CPC ...... *H04L 63/1416* (2013.01); *H04L 63/1441* (2013.01); *H04L 67/12* (2013.01)

(56) References Cited

U.S. PATENT DOCUMENTS

| | | | | |
|---|---|---|---|---|
| 7,756,544 | B1* | 7/2010 | Graham | H04W 52/0258 370/310 |
| 8,213,313 | B1* | 7/2012 | Doiron | H04L 43/028 370/235 |
| 2001/0039623 | A1* | 11/2001 | Ishikawa | H04L 12/12 726/23 |
| 2003/0105976 | A1 | 6/2003 | Copeland, III | |
| 2005/0076228 | A1* | 4/2005 | Davis | G06F 21/72 713/188 |
| 2005/0076235 | A1 | 4/2005 | Ormazabal et al. | |
| 2006/0117384 | A1* | 6/2006 | Larson | G06F 21/55 726/22 |
| 2008/0168559 | A1* | 7/2008 | Touitou | H04L 63/0236 726/23 |
| 2009/0178139 | A1* | 7/2009 | Stute | H04L 63/1433 726/22 |

FOREIGN PATENT DOCUMENTS

| | | |
|---|---|---|
| EP | 2656581 A1 | 10/2013 |
| WO | WO2012139924 A1 | 10/2012 |

* cited by examiner

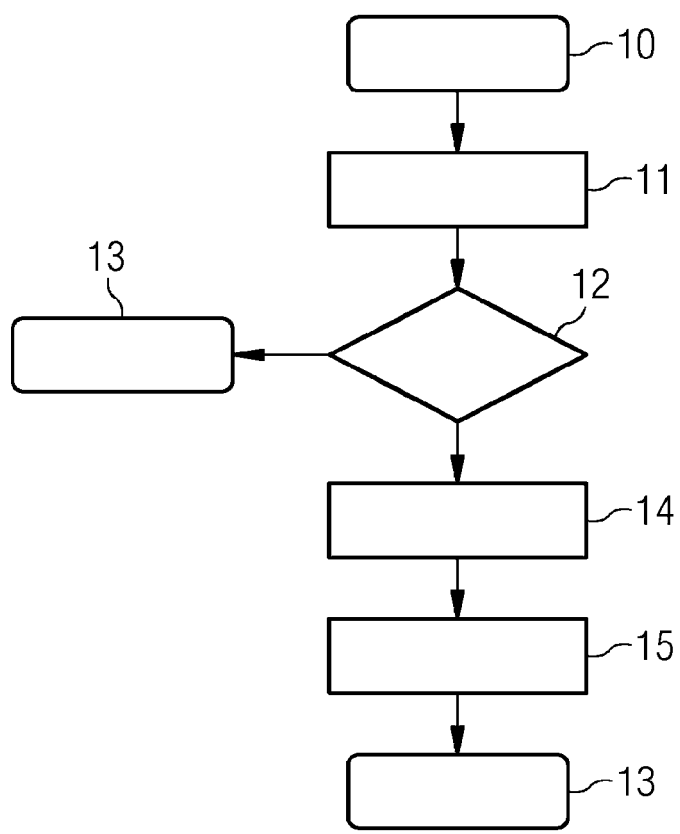

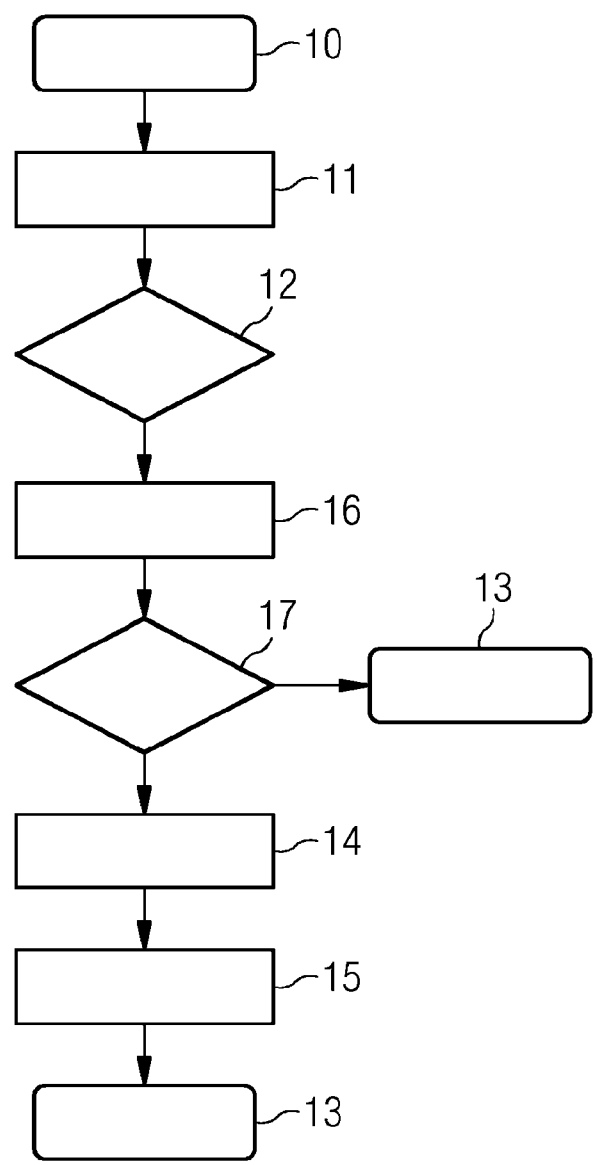

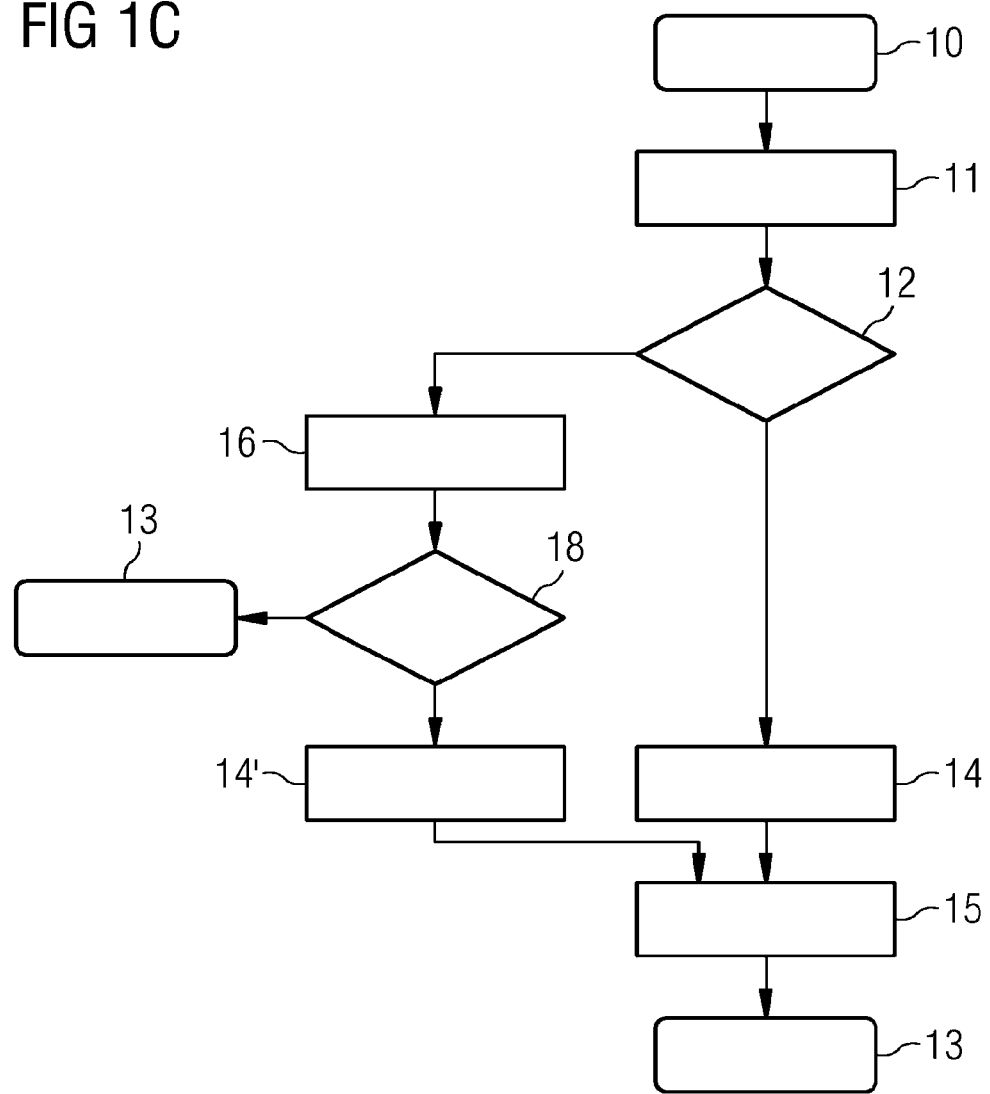

METHOD, DEVICE, AND SYSTEM FOR MONITORING A SECURITY NETWORK INTERFACE UNIT

This application is the National Stage of International Application No. PCT/EP2014/065714, filed Jul. 22, 2014, which claims the benefit of German Patent Application No. DE 10 2013 216 847.0, filed Aug. 23, 2013. The entire contents of these documents are hereby incorporated herein by reference.

TECHNICAL FIELD

The present embodiments relate to monitoring a network gateway unit.

BACKGROUND

Security network gateway units (e.g., firewalls) are installed at network boundaries in order to couple differently critical network areas in a controlled manner. The data traffic is filtered in this case, with the result that only permissible data traffic is let through. In industrial automation systems (e.g., a signal tower or a train controller in railway automation), in production halls in manufacturing automation, or in refineries or breweries in process automation, automation areas that are critical with regard to security are coupled to general networks (e.g., an office network). For this purpose, security gateways or firewalls are used and configured such that only authorized data traffic may pass through.

In this case, the data stream is filtered according to configurable filtering rules. Owing to errors in an implementation of the security network gateway unit or owing to errors in configuration, such as filtering rules, or else as a result of the security network gateway unit being compromised by an attack on the gateway unit itself, a security network gateway unit may operate incorrectly and let impermissible data packets through.

Some shortcomings of a security network gateway unit have been reduced by connecting a plurality of security network gateway units (e.g., a plurality of firewalls) in series. Network gateway units from different manufacturers may be used. However, this has the disadvantage that the delay and the jitter is increased as a result of longer processing times; therefore, the requirements for real-time communication are not met.

The filtering rules are to be continuously updated in a security network gateway unit in order to be able to provide protection, such as against new attacks (e.g., caused by viruses or worms). In some industrial automation environments, high demands are imposed on the integrity, with the result that the security network gateway units and the filtering rules implemented therein are to be authorized, and it is not permissible to change or update the configuration of the security network gateway units, the filtering rules, or the antivirus software. It is also to be provided that the data stream is not changed by a security network gateway unit to the automation network (e.g., no additional data packets are fed into the automation network by the network gateway unit).

For example, application number DE 10 2011 007 387 discloses self-monitoring of a security network gateway unit. In this application, a check is carried out in order to determine whether a corresponding incoming data packet has been received for an outgoing data packet, making it possible to provide that a network gateway unit does not itself generate data packets in the event of a malfunction.

SUMMARY AND DESCRIPTION

The scope of the present invention is defined solely by the appended claims and is not affected to any degree by the statements within this summary.

The present embodiments may obviate one or more of the drawbacks or limitations in the related art. For example, the present embodiments provide a method, a device, and a system that reliably filter impermissible data traffic in a transition to a security-relevant data network and provides data integrity in the security-relevant data network in the case of a defective security network gateway unit. In this case, the present embodiments provide absence of a reaction of the security network gateway unit (e.g., additional data packets may not be introduced into the security network by the security network gateway unit).

In one or more of the present embodiments, a method for monitoring a security network gateway unit (e.g., for example a firewall) is provided. The security network gateway unit receives a stream of data packets via a first interface, checks this data stream with respect to filtering rules and outputs the stream of data packets to a second interface. The method includes the acts of duplicating and outputting the data stream at the second interface, checking the output data stream for impermissible data traffic, transmitting a warning message to the security network gateway unit if impermissible data traffic is detected in the data stream, and restricting the data stream by the security network gateway unit if the warning message is received in the security network gateway unit.

Because the data stream is tapped off at the second interface that is downstream of the security network gateway unit and is within the security-relevant data network, a malfunction of the security network gateway unit may be detected by checking this filtered data stream. Another advantage is that, in the case of such a suspicion, the security network gateway unit is informed of the suspicion and may promptly initiate measures for restricting the data stream. In this case, messages are prevented from being introduced into the security-relevant data network itself (e.g., into the second interface) because the data stream is only restricted by the security network gateway unit (e.g., a firewall) as a consequence of the suspicion being reported. Therefore, a security network gateway unit that requires authorization or is certified, for example, may be monitored by updated filtering software in a monitoring unit without having to adapt, and therefore reauthorize or certify, the configuration or the software version of the network gateway unit itself. If impermissible data traffic is indicated, the data traffic is restricted by the security network gateway unit. The security network gateway unit may take suitable measures (e.g., as a result of additional information in the warning message) based on the additional information.

In one embodiment, the method includes the additional method acts of duplicating and outputting the data stream at the first interface, comparing the data stream at the first interface with the data stream at the second interface, and transmitting a warning message to the security network gateway unit if the data stream from the second interface differs from the data stream from the first interface.

This embodiment may have the advantage that impermissible data traffic successfully averted by the security network gateway unit is also detected. In this case, based on specifications made, a change may be made to a restrictive operating mode of the security network gateway unit (e.g., a firewall). As a result, it is also detected if new data packets that were not present at the first interface are introduced into the security-relevant data network, and the data stream is immediately restricted by the security network gateway unit.

In one embodiment, the data stream is restricted by activating replacement filtering rules of the security network gateway unit. Therefore, for example, coordinated and authorized filtering rules or restrictive filtering rules for a restricted mode may be defined in advance, and these rules may be immediately activated if impermissible data entry to the security-relevant data network is suspected.

The risk may therefore be quickly averted with the limited downtime of the network gateway.

In one embodiment, the data stream is restricted by restarting the security network gateway unit with protected boot software, by restarting the security network gateway unit with replacement firmware, or by changing from an active virtual machine to a replacement virtual machine in a firewall.

Restarting the security network gateway unit may make it possible to reverse manipulation of the software of the network gateway unit because the software is changed to an initial starting state again during a restart. In the case of embedded systems, a restart may be reset with replacement firmware that either corresponds to the starting state of the original network gateway unit or includes stricter filtering rules. The replacement firmware may be stored in a read only memory or in a flash memory that may not be modified during normal operation of the firewall. When a security network gateway unit is implemented in the form of a virtual machine, a corresponding effect may be achieved by changing from an active virtual machine to a replacement virtual machine. In this case, the downtimes during the change are particularly short. The data traffic to the security-relevant data network is therefore interrupted only very briefly.

In another embodiment, the data stream is restricted by deactivating the second interface and/or by deactivating the first interface of the firewall.

If the second interface is deactivated, it is provided that no further data may enter the security network. Deactivating the first interface of the network gateway unit avoids overflowing of the filters or damage to the security network gateway unit as a result of the arriving data stream.

In another embodiment, the data stream is restricted by deactivating a power supply of the security network gateway unit.

A physical interruption of the data stream beyond the network boundary is provided. This measure has the advantage that the measure may be used for any security network gateway unit irrespective of available or unavailable ways for restricting data at the network gateway unit. This provides, with very high reliability, that no data communication takes place via the security network gateway unit. This also makes it possible to achieve the situation in which log data possibly permanently stored on the security network gateway unit and the software version are available for subsequent evaluation (e.g., log data and the software version are not overwritten or deleted).

In one embodiment, the restriction of the security network gateway unit remains active as long as the warning message is received at the firewall.

This has the advantage that, after the security gap has been rectified, data communication may be immediately activated again beyond the network boundary. Downtimes are therefore minimized.

In another embodiment, the restriction of the network gateway unit remains active until an explicit signal for canceling the restriction (e.g., as a result of an action by administration personnel) is received at the security network gateway unit.

This has the advantage that the network gateway unit becomes operational again only after the defect has been rectified or after carrying out all desired measures. In one embodiment, a local input interface (e.g., a pushbutton or a key switch) is provided on the security network gateway unit for this purpose.

The device according to an embodiment is provided for monitoring a security network gateway unit that receives a stream of data packets via a first interface, checks the data stream with respect to filtering rules and outputs the data to a second interface. The device includes an outputting unit configured to duplicate the data stream at the second interface and to output the data to a line, a checking unit configured to check the output data stream for impermissible data traffic, and a communication unit configured to transmit a warning message to the security network gateway unit if impermissible data traffic is detected in the data stream.

This device may check a security network gateway unit using permanently predefined filtering rules that may be configured only with difficulty (e.g., by checking the data stream output by the network gateway unit using a device equipped with the most recent security rules) and may also detect new methods of attack or impermissible data. Because the device does not have any influence on the data stream at the second interface, the device operates without a reaction (e.g., without intervening in the security-relevant data network to which the data are passed). There is nevertheless a quick reaction with respect to restricting the data stream at the second interface. This may be advantageous if the actual security network gateway unit cannot be updated, or the gateway unit may only be updated to a limited extent (e.g., filtering rules may be updated or patched, such as owing to required certification or authorization that may be repeated during an update). In contrast, the device (e.g., the monitoring device discussed below) may be flexibly updated because the device does not have any reaction with respect to the permissible communication. As long as the "active" security network gateway unit is sufficiently good in this case, a security network gateway unit that has not been updated may remain in operation. However, as soon as the occurrence of impermissible data traffic is observed, the connectivity is externally restricted.

In one embodiment, the device includes an additional outputting unit configured to duplicate and output the data stream at the first interface, and a comparison unit configured to compare the output data stream from the first interface with the data stream from the second interface and to cause the communication unit to transmit a warning message to the security network gateway unit if differences between the data stream from the second interface and the data stream from the first interface are detected.

As a result, it is detected whether the network gateway unit successfully averts impermissible data traffic and if the network gateway unit is operating incorrectly (e.g., changed by manipulation) and outputs additional data packets that have not been received via the first interface to the second interface.

The system for monitoring a security network gateway unit includes a security network gateway unit configured to receive a stream of data packets via a first interface, to check this data with respect to filtering rules, and to output the data sets to a second interface.

The system also includes a monitoring unit having an outputting unit configured to duplicate and output the data stream at the second interface, a checking unit for checking the output data stream for impermissible data traffic, and a communication unit configured to transmit a warning message to the security network gateway unit if impermissible data traffic is detected in the data stream (e.g., upon which the security network gateway unit is set up to restrict the data stream).

In one embodiment, the warning message may be provided as an electrical switching signal.

In one embodiment of the system, the monitoring unit also includes an outputting unit configured to duplicate and output the data stream at the first interface, and a comparison unit configured to compare the output data stream from the first interface with the data stream from the second interface and to cause the communication unit to transmit a warning message to the security network gateway unit if differences between the data stream from the second interface and the data stream from the first interface are detected.

A computer program having program instructions for carrying out the method and a data storage medium (e.g., a non-transitory computer-readable storage medium) that stores the computer program are also provided.

Exemplary embodiments of the method according to the invention, the device according to the invention and the system according to the invention are illustrated by way of example in the drawings and are explained in more detail using the following description.

BRIEF DESCRIPTION OF THE DRAWINGS

FIG. 1a depicts an embodiment of a method in a flowchart.

FIG. 1b depicts another embodiment of the method in a flowchart.

FIG. 1c depicts another embodiment of the method in a flowchart.

Parts that correspond to one another are provided with the same reference symbols in all figures. The security network gateway unit is also referred to only as network gateway unit below.

DETAILED DESCRIPTION

Figure 2:
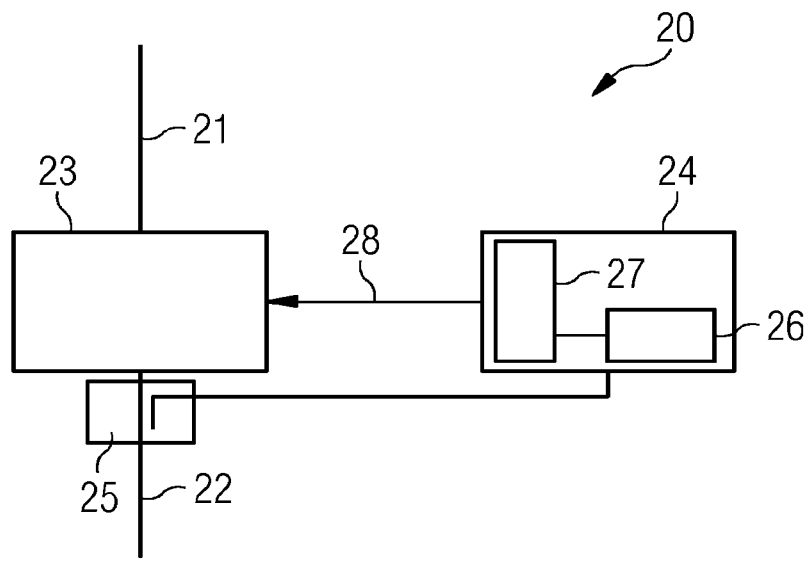
FIG. 2 depicts a schematic illustration of an embodiment of a system with output of a data stream only at a second interface.

FIG. 1a depicts one embodiment of a method for monitoring correct function of a network gateway unit with the absence of a reaction. In this embodiment, the absence of a reaction indicates that the data network to which the data traffic is passed is not influenced by the network gateway unit. For example, no additional data packets are generated and output to such a security-relevant automation network (e.g., by the network gateway unit).

In state 10 of the method, the security network gateway unit receives a data stream from a first data network at a first interface and, after checking, outputs the data stream to a second interface in a second data network (e.g., a security-relevant automation network).

In act 11, the data stream is duplicated at the second interface (e.g., within the second data network), and is output (e.g., to a separate line). In this case, the data stream is to be output within the security-relevant network and upstream of components that change the data stream. In act 12, the output data stream is checked for impermissible data traffic. For example, the check 12 may take place by filtering rules corresponding to the active filtering rules of the network gateway unit. However, the output data stream may be checked by extended filtering rules (e.g., filtering rules updated with the most recent antivirus patches). In this case, an IP address of the data packets and/or the port numbers in the data packet or the useful data contents in the data packet may be checked, or the data stream may be examined for specific attack patterns over a plurality of data packets.

The checking 12 takes place in a manner completely decoupled from the checking of the data stream in the network gateway unit. The data stream at the second interface is neither delayed in terms of time nor changed in terms of content. The checking 12 of the output data stream therefore remains completely invisible and therefore has no reaction for the network receiving the data stream. If the data stream is identified as permissible data traffic, the data packets are output to the second interface and the method is terminated in act 13.

If impermissible data traffic is detected in the data stream, a warning message is transmitted to the network gateway unit in act 14. If the network gateway unit receives the warning message, the network gateway unit initiates restriction of the data stream in act 15. The method may be terminated in act 13.

In one variant of the method illustrated in FIG. 1b, a check is additionally carried out for a data packet from the second interface that has not already been identified as permissible in act 12 based on the data stream received at the first interface. A data stream duplicated and output at the first interface of the network gateway unit is recorded for this purpose in act 16. In act 17, the output data stream from the first interface is used to check the data packet further.

A status message (e.g., an overload message or a maintenance mode message) may be emitted by the network gateway unit at the second interface, for example, which is permissible in this example only when particular data packets have been received at the first interface of the network gateway. For example, it is possible to check whether there is a denial-of-service attack pattern at the first interface of the network gateway unit or whether maintenance access (e.g., remote service access) to the network gateway unit takes place via the first interface of the network gateway unit (e.g., via an HTTPS or SSH connection).

If the data stream is identified as permissible data traffic during the check in act 17, the data packets are output to the second interface and the method is terminated in act 13. If the packet from the second interface is identified as impermissible, a warning message is transmitted to the network gateway unit in act 14, whereupon the network gateway unit causes the data stream to be restricted (e.g., act 15).

In another embodiment of the method, the data stream entering the security network gateway unit is duplicated and output at the first interface, and the output data stream from the first interface is then compared with the output data stream from the second interface. This check may be carried out in parallel with the checks illustrated in FIG. 1a or FIG. 1b.

In the variant illustrated in FIG. 1c, this additional check 18 is carried out if the data stream is identified as permissible data traffic in act 12. For this purpose, a data stream duplicated and output at the first interface of the network gateway unit is recorded in act 16. In act 18, the output data stream from the first interface is used to check the data packet further. For the data packet received at the second interface, a check is carried out to determine whether an identical packet was present in the data stream from the first interface or was present in the data stream from the first interface (e.g., former time window). If an identical packet was present, this check is terminated in act 13. If, however, an inconsistency in the two data streams is determined, a warning message is transmitted to the network gateway unit in act 14', whereupon the network gateway unit causes the data stream to be restricted in act 15.

This additional check illustrated in FIG. 1c may also be added to the variant illustrated in FIG. 1b.

Comparing the incoming data stream with the outgoing data stream makes it possible to detect that filtering by the network gateway unit has taken place (e.g., if impermissible incoming data packets are not contained in the outgoing data stream). In contrast, if data packets that did not arrive at the first interface in the network gateway unit are detected in the outgoing data stream at the second interface, an error in the network gateway unit may be inferred. For example, it is possible to detect if the network gateway unit does not block a data packet or forward the data packet without change, but rather, emits a modified data packet or an additional data packet. In this case, it is therefore possible to detect if the network gateway unit emits a data packet that the network gateway unit has not previously actually received.

The warning message causes the network gateway unit to change to a restrictive filtering mode (e.g., by activating replacement filtering rules). In one variant, the warning message may cause the network gateway unit to restart, which may be carried out with an unchanged, supported software version or boot image, resulting in a permanently stored permissible default configuration or recovery configuration that is activated again. If the network gateway unit is in the form of an embedded system, the main memory is reset to an initial state during a restart. A defective or manipulated software version may be deactivated.

Alternatively, the network gateway device may be restarted with a replacement firmware image. For example, two file system partitions with different implementations of the network gateway unit may be provided. If a warning message is received in the network gateway device, a restart is carried out (e.g., the file system partition with the restrictive implementation is started).

If the network gateway unit is implemented in the form of a virtual machine with a hypervisor or microvisor, a plurality of logical partitions are present separately as virtual machines or partitions. Data packet filtering is carried out in this case in a virtual machine. If the warning message is applied, a first virtual machine is deactivated and a replacement virtual machine with restrictive filtering regulations and/or an alternative filter implementation is activated. Such a change is possible in less than one second (e.g., in the range of milliseconds), allowing virtually uninterrupted operation of the network gateway device.

In one variant, the monitoring unit is in the form of a separate physical component. In another variant, the monitoring unit is in the form of a virtual machine that is executed by the same hypervisor or microvisor as the network gateway unit.

Further, if the warning message is applied or received, one or both interfaces may be deactivated. The second interface may be deactivated, with the result that no data packets are output to the second interface. It may be advantageous to deactivate the first interface in order to avoid overflowing of the memories in the network gateway unit. Deactivating the first interface may terminate the data traffic to the security-relevant data network.

A universally usable variant for restricting the data traffic is to deactivate the power supply of the network gateway unit (e.g., to switch the network gateway unit off). This is possible with very little effort (e.g., by a switchable power supply unit of the network gateway unit) without changing the configuration or implementation of the network gateway unit itself. Network gateway units that do not support any explicit restriction mechanisms may also be monitored by this method, and the data traffic may be restricted.

In one embodiment of the method, the restrictive, limiting mode of the network gateway unit remains activated as long as the warning message is applied to the network gateway unit. However, the restrictive mode may remain active until an explicit change to a normal mode is made by an administrative action. For example, the normal mode may be triggered by pressing a physical pushbutton or by actuating a key switch, or by an input via a logical administration interface by administration personnel. In this case, the normal mode may also include a new updated filtering rule. The method then changes to the final state denoted by stop.

FIG. 2 illustrates a system including a network gateway unit 23 and a monitoring unit 24. For example, the network gateway unit 23 separates two data networks with different security classifications. In this case, a data stream from a network with a low security requirement, such as an office network, is connected to the network gateway unit 23 via a first interface 21. The network gateway unit 23 checks the data packets or the stream of data packets, and outputs the stream via a second interface 22 (e.g., to a second network that has higher security requirements).

In the embodiment illustrated in FIG. 2, only the outgoing data stream at the second interface is duplicated and output to a separate line by an outputting unit 25. The output data stream is forwarded to the checking unit 26 of the monitoring unit 24 and is checked for impermissible data traffic there. In this case, the address fields in the header of the data packet, for example, may be checked for impermissible origin or destination addresses, or the port number may be compared with permissible port numbers. If the useful contents of the data packet are present in unencrypted form (e.g., in plain text), the contents of the packets may also be checked for suspicious or impermissible patterns, and the data packet may be prevented from being forwarded even before the checking of the data packet is concluded.

The checking unit 26 is connected to a communication unit 27. If impermissible data traffic is detected in the checking unit 26, the checking unit 26 reports this to the communication unit 27, which transmits or applies a warning message 28 to the network gateway unit 23. For example, the warning message may be provided as an electrical switching signal.

Figure 3:
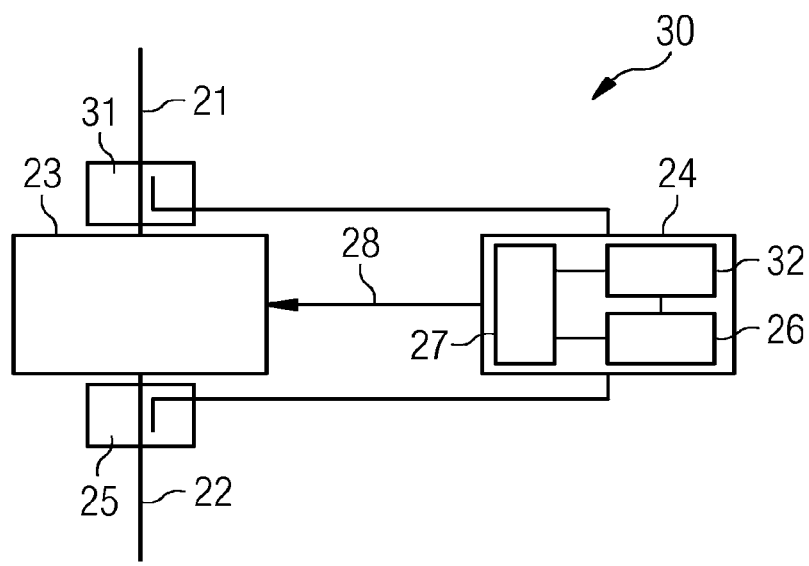
FIG. 3 depicts a schematic illustration of another embodiment of a system with output of the data stream at a first interface and a second interface.

FIG. 3 depicts a variant of the system in FIG. 2, in which, in addition to the outgoing data traffic at the second interface 22, the incoming data stream at the first interface 21 is also duplicated and output to a line to the monitoring unit 24 by an additional outputting unit 31. The outputting units 25 and 31 may be situated directly at the network gateway unit 23, resulting in that no further components that could change the data stream are contained in the network gateway unit 23.

The data stream output from the first interface 21 is compared with the data stream from the second interface 22 in the comparison unit 32. For example, the data stream from the second interface 22 may be forwarded to the comparison unit 32 via the checking unit 26. The comparison unit 32 is connected to the communication unit 27. If a difference is detected between the data stream from the first interface 21 and the data stream from the second interface 22, the communication unit 27 transmits a warning message 28 to the network gateway unit 23. The connection between the monitoring unit 24 and the network gateway unit 23 may be in the form of a wired connection or else a wireless connection or a logical connection.

All of the described and/or depicted features may be combined with one another within the scope of this disclosure. The monitoring unit may be in the form of a separate component or may be integrated with the network gateway unit.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for monitoring a security network gateway unit that receives a stream of data packets via a first interface, checks the data stream with respect to filtering rules, and outputs the data stream to a second interface, the method comprising:
   duplicating and outputting the data stream at the second interface;
   checking the output data stream for impermissible data traffic;
   transmitting a warning message to the security network gateway unit when impermissible data traffic is detected in the data stream; and
   restricting the data stream by the security network gateway unit when the warning message is received in the security network gateway unit, wherein restricting the data stream comprises restarting the security network gateway unit with protected boot software, restarting the security network gateway unit with a replacement firmware image, or changing from an active virtual machine to a replacement virtual machine in the security network gateway unit.

2. The method of claim 1 further comprising:
   duplicating and outputting the data stream at the first interface;
   comparing the data stream at the first interface with the data stream at the second interface; and
   transmitting a warning message to the security network gateway unit when the data stream from the second interface differs from the data stream from the first interface.

3. The method of claim 1, wherein restricting the data stream further comprises activating replacement filtering rules of the security network gateway unit.

4. The method of claim 1, wherein restricting the data stream further comprises deactivating the second interface, deactivating the first interface of the security network gateway unit, or a combination thereof.

5. The method of claim 1, wherein restricting the data stream further comprises deactivating a power supply unit of the network gateway unit.

6. The method of claim 1, wherein the restriction of the data stream of the security network gateway unit remains active while the warning message is received at the security network gateway unit.

7. The method of claim 1, wherein the restriction of the data stream remains active until an explicit signal for canceling the restriction is received at the security network gateway unit.

8. The method of claim 7, wherein the explicit signal for canceling the restriction is the result of an action by administration personnel.

9. A device for monitoring a security network gateway that receives a stream of data packets via a first interface, checks the stream of data packets with respect to filtering rules and outputs the stream of data packets to a second interface, the device comprising:
   a processor configured to:
      duplicate and output the stream of data packets at the second interface;
      check the output stream of data packets for impermissible data traffic; and
      transmit a warning message to the security network gateway when impermissible data traffic is detected in the stream of data packets,
   wherein the security network gateway is configured to restrict the data stream when the warning message is received in the security network gateway,
   wherein restricting the data stream comprises restarting the security network gateway with protected boot software, restarting the security network gateway with a replacement firmware image, or changing from an active virtual machine to a replacement virtual machine in the security network gateway.

10. The device of claim 9,
   wherein the processor is further configured to:
      duplicate and output the data stream at the first interface;
      compare the output data stream from the first interface with the data stream from the second interface; and
      transmit a warning message to the security network gateway when differences between the data stream from the second interface and the data stream from the first interface are detected.

11. A system for monitoring a security network gateway, the system comprising:
   a security network gateway configured to:
      receive a stream of data packets via a first interface;
      check the stream of data packets with respect to filtering rules; and
      output the stream of data packets to a second interface; and
   a processor configured to monitor the security network gateway, the processor configured to:
      duplicate and output the stream of data packets at the second interface;
      check the output data stream for impermissible data traffic; and
      transmit a warning message to the security network gateway when impermissible data traffic is detected in the stream of data packets,
   wherein the security network gateway is configured to restrict the stream of data packets, wherein restricting the data stream comprises restarting the security network gateway with protected boot software, restarting the security network gateway with a replacement firmware image, or changing from an active virtual machine to a replacement virtual machine in the security network gateway.

12. The system of claim 11, wherein the processor is further configured to:
  duplicate and output the stream of data packets at the first interface;
  compare the output data stream from the first interface with the stream of data packets from the second interface; and
  transmit a warning message to the security network gateway when differences between the stream of data packets from the second interface and the stream of data packets from the first interface are detected.

13. The system of claim 12, wherein the restriction of the stream of data packets comprises activating replacement filtering rules of the security network gateway.

14. A non-transitory computer-readable storage medium storing instructions executable by a processor to monitor a security network gateway unit that receives a stream of data packets via a first interface, checks the data stream with respect to filtering rules, and outputs the data stream to a second interface, the instructions comprising:
  duplicating and outputting the data stream at the second interface;
  checking the output data stream for impermissible data traffic;
  transmitting a warning message to the security network gateway unit when impermissible data traffic is detected in the data stream; and
  restricting the data stream by the security network gateway unit when the warning message is received in the security network gateway unit,
  wherein restricting the data stream comprises restarting the security network gateway unit with protected boot software, restarting the security network gateway unit with a replacement firmware image, or changing from an active virtual machine to a replacement virtual machine in the security network gateway unit.

* * * * *